United States Patent [19]

Chika

[11] Patent Number: 4,457,717

[45] Date of Patent: Jul. 3, 1984

[54] APPARATUS TO HELP LEARNING PICTORIAL ART

[76] Inventor: John J. Chika, 1350 Orchard Ridge Rd., Bloomfield Hills, Mich. 48013

[21] Appl. No.: 365,557

[22] Filed: Apr. 5, 1982

[51] Int. Cl.$^3$ .............................................. G09B 11/06
[52] U.S. Cl. ................................... 434/88; 248/444.1
[58] Field of Search ....................... 434/88, 89, 90, 91, 434/84, 85; 33/1 K, 277; 248/441 R, 441 A

[56] References Cited

U.S. PATENT DOCUMENTS

| | | | |
|---|---|---|---|
| 491,160 | 2/1893 | Cross | 434/85 |
| 508,468 | 11/1893 | Cross | 434/85 |
| 1,041,435 | 10/1912 | Cross | 434/85 |
| 1,282,382 | 10/1918 | Cross | 434/90 |
| 2,313,518 | 3/1943 | Cross | 434/85 |
| 2,796,666 | 6/1957 | Liebowitz | 434/90 X |
| 3,340,622 | 9/1967 | Sherriff | 434/88 |
| 3,678,589 | 7/1972 | Baier | 33/277 |
| 4,098,009 | 7/1978 | Flynn | 434/88 |
| 4,226,029 | 10/1980 | McGuire | 434/88 |
| 4,379,364 | 4/1983 | Fish | 434/90 X |

Primary Examiner—William H. Grieb

[57] ABSTRACT

An apparatus to facilitate the learning and practice of realistic free-hand drawing and painting. Instead of paper or canvas, a panel of specifically configured, relatively thin, film-like, transparent material is used. Such transparent panel is temporarily secured to heavier, rigid and also transparent panel while sketching, drawing or painting is being done on its face, using specifically configured and modified artists materials. Specifically configured supporting apparatus adjustably supports, positions and maintains such panels of clear materials at the desired proximity in front of the artist, while he sketches, draws or paints on such transparent panel whatever he sees when looking directly through it. Additional assisting means are provided for his optional use.

23 Claims, 11 Drawing Figures

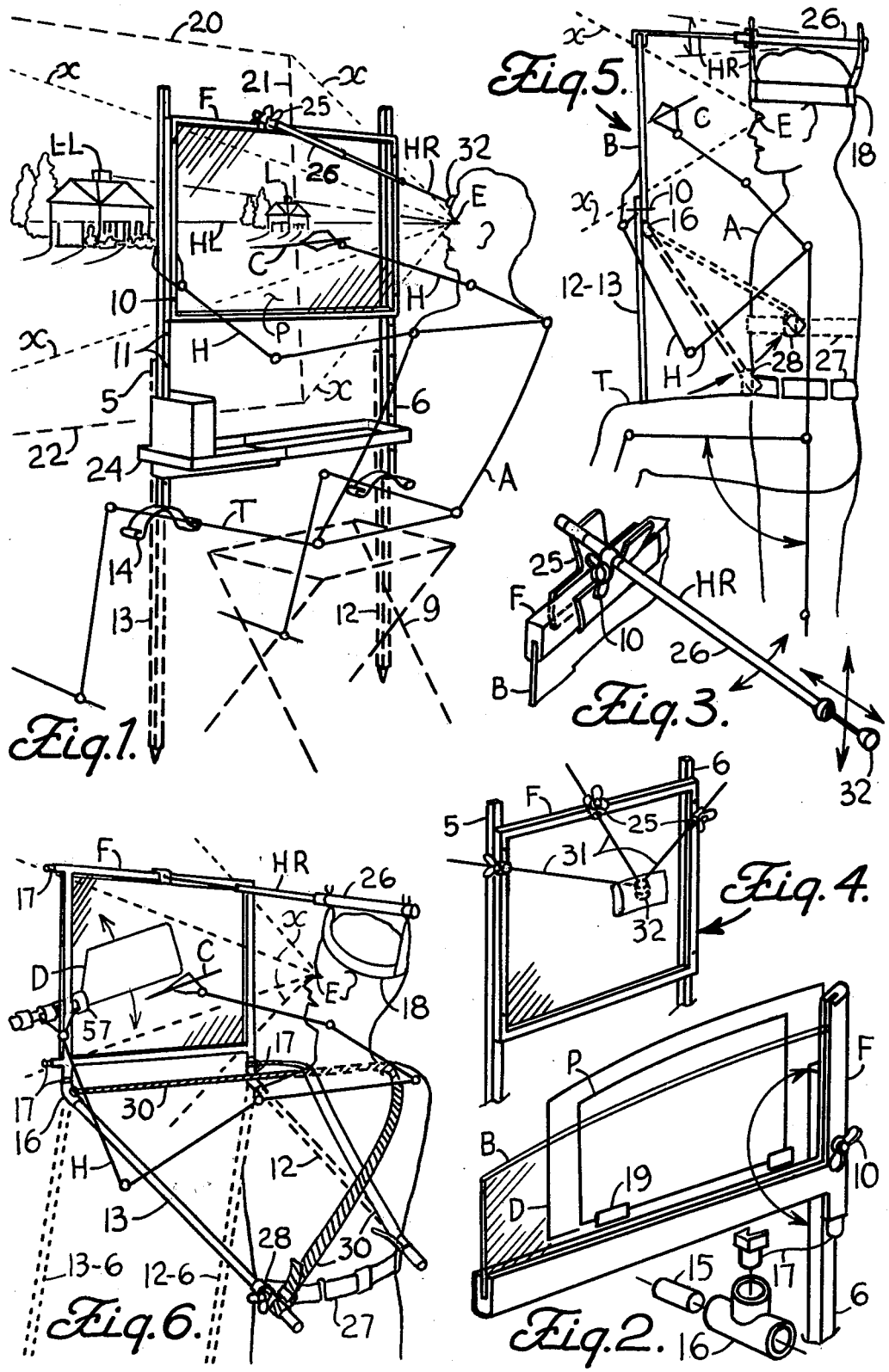

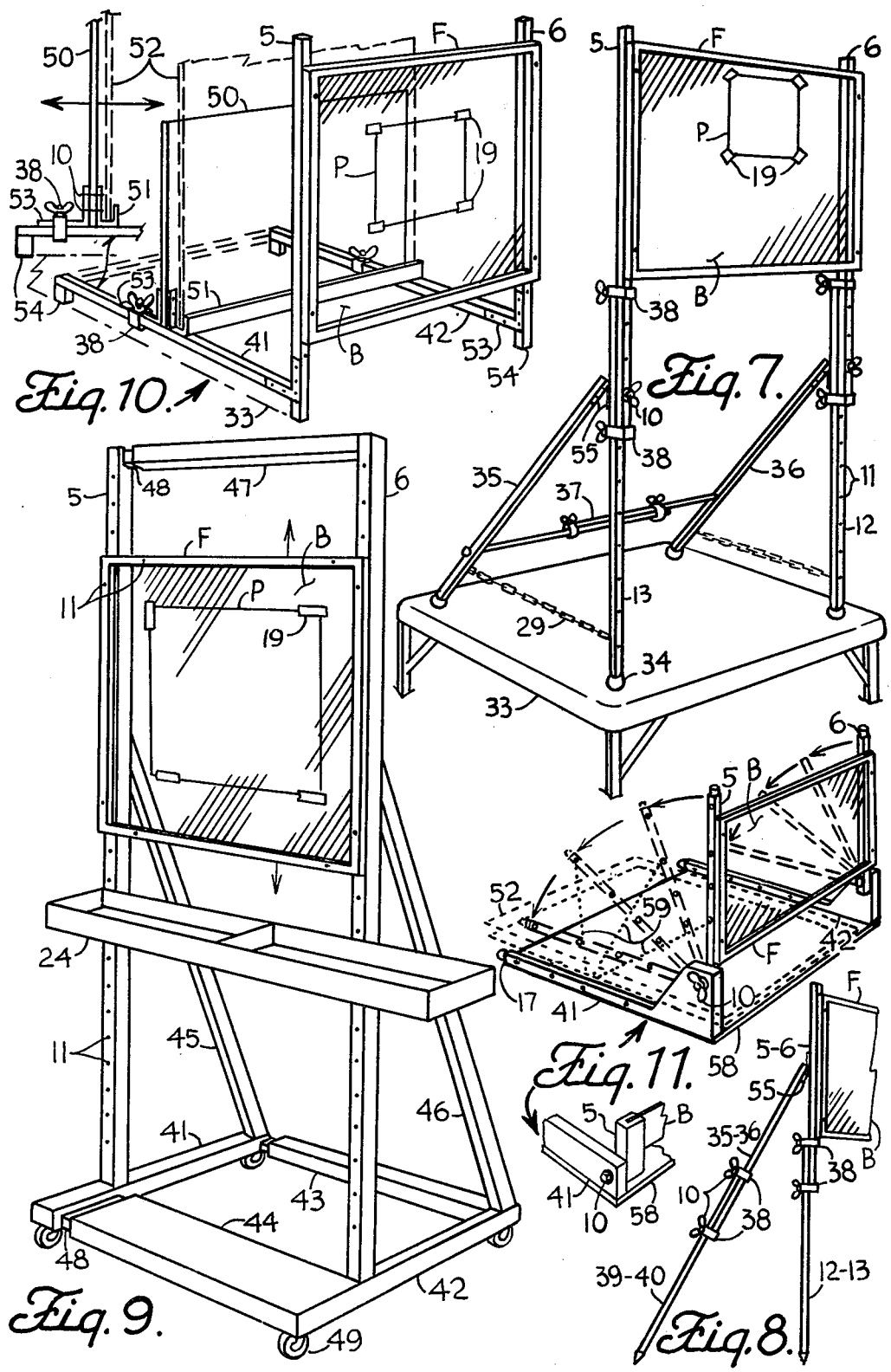

APPARATUS TO HELP LEARNING PICTORIAL ART

CROSS REFERENCES TO RELATED PATENTS

The search through Class 35, Subclass 26 led to the new Class 248-441=Easels, Class 434-84=Painting and Class 434-85=Drawing. The closest references found are as follows:

| | | | |
|---|---|---|---|
| 491,160 | 2/1893 | Cross | |
| 508,468 | 11/1893 | Cross | |
| 1,041,435 | 10/1912 | Cross | |
| 1,282,382 | 10/1918 | Cross | |
| 2,313,518 | 3/1943 | Cross | 35/26 |
| 4,098,009 | | Flynn | 35/26 |
| 4,226,029 | 10/1980 | McGuire | 35/26 |

BACKGROUND OF THE INVENTION

The art of realistic sketching, drawing and painting is admired by most people, but mastered by very few. Since it could be stated that all realistic pictures represent a view of some scene or objects as they would appear if seen through an imaginary window, this invention provides just such a window-pane, makes it portable and positionable to frame the very scene or objects that the artist wishes to sketch, draw or paint, and provides for the right type of materials to do it with in either the realistic or in any type of interpretative pictorial style of art. No artistic liberties are interfered with.

FIELD OF THE INVENTION

This invention relates primarily to the art or process of delienation of pictorial portrayal means of lines, as employed in the visual art of free-hand sketching, drawing and painting as covered in class 434, subclass 85, involving production of a likeness or impression by making lines or marks on a surface, and secondarily as in subclass 434-84 involving placement of color on a surface. Also it relates to the construction of novel supportive apparatus under class 248-441 R (easels). While all existing artist easels are configured to support non-transparent, opaque panels of material, the instant invention teaches construction of an apparatus which supports such transparent window-like panel on which the artist may sketch, draw or paint his own interpretation of what he sees when looking directly through it. Other auxiliary aids to the artist are disclosed.

DESCRIPTION OF THE PRIOR ART

Up to the present time, anybody's ability to draw or paint any satisfactory picture of any realistic scene or object is determined by their artistic talent. This invention enables any person who can "trace" or "copy" what they see on the window-like panel in front of them to satisfy their artistic ambition and express themselves in any style of interpretation desired.

SUMMARY OF THE INVENTION

This invention provides a time-saving apparatus for mastering the art of realistic free-hand sketching, drawing and painting. It is most helpful to those who have difficulty to draw correctly on a blank, opaque surface the scene or objects they see with their eyes.

All realistic pictures disclose views of various scenes or objects as they would appear if viewed through an immaginary window. Basically, this invention provides for such a transparent "window", makes it portable and adjustably supportable at any desired proximity in front of an artist, so he or she may "trace" or "copy" on such window's surface just what they see when looking directly through it. Thus, artists may practice fast sketching and drawing, study correct proportioning in perspective, compositions or layouts, drawing of all types from the first rough sketch to the finished picture.

BRIEF DESCRIPTION OF THE DRAWINGS

To further explain this concept and its many improvements over the existing art of record, the following drawings are enclosed:

FIG. 1 is a phantom perspective view of the overall concept of the "Duopod" embodiment of this invention;

FIG. 2 is a perspective of a construction detail;

FIG. 3 is a perspective view of the head-rest;

FIG. 4 shows a multiple support for the head-rest;

FIG. 5 shows the simplest embodiment of the invention;

FIG. 6 is a phantom perspective of another embodiment;

FIG. 7 is a perspective view of the free-standing "Quadpod";

FIG. 8 shows outdoor type "Quadpod";

FIG. 9 shows the studio type of "Quadpod";

FIG. 10 shows a combination embodiment of this invention;

FIG. 11 shows a combination portable and convertible embodiment of this invention for beginners use.

DESCRIPTION OF THE PREFERRED EMBODIMENTS

Referring now to the drawings in detail, like numerals are used throughout all Figures to designate substantially like components. FIGS 1-6 illustrate embodiments related to the "Duopod" apparatus which provides only partial support for the picture-plane-panel P, while FIGS. 7-10 illustrate a freestanding "Quadpod" apparatus, not depending on its user for any of its support; FIG. 11 shows a portable and convertible combination of both embodiments.

FIG. 1 is a perspective phantom view showing the basic concept of this invention. The artist A is seated on a seat 9, supporting on his thighs T one type of a "Duopod" comprising left half 5 and right half 6 which adjustably support between them the rigid frame F which encloses a rigid panel B of clear acrylic sheet material similar to Plexiglass, as commonly used for architectural safety glazing needs. When artist A looks through thus framed and supported panel B, the frame F defines his field of vision marked by dashed lines 20,21 and 22 on the scene and dashed lines X radiating from either of his eyes E. If the artist decides to draw or paint the scene he sees through the pane B, he places a picture-plane-panel P, configured of specifically formulated clear, synthetic material such as cellulose acetate film of desired thickness, and temporarily secures it to the facing side of panel B by such means as tape 19, as shown in detail in FIG. 2. Then, using art materials C specifically configured to adhere to non-porous, glass-like surface of panel P, the artist "trace-draws" what he sees within frame F directly on the face of the film-like panel P, as if he was "tracing" it on an imaginary window panel.

This defines the substance of this invention, and the more detailed description of this concept follows.

The "Duopod" shown in FIG. 1 differs from any common type of artist "tripod" easel which would obstruct the clear view through the rigid, clear panel B enclosed by the frame F which determines the overall width of thus assembled "Duopod". Such apparatus consists of three major assemblies: the frame F and two identical left and right supporting assemblies 5 and 6 supporting such frame in any desired proximity to its user.

The frame F is vertically adjustable by means of bolts and wing-nuts 10 inserted into evenly spaced holes 11 drilled in the frame F and side members 5 and 6. The utility tray 24 may be laterally adjustable to match various widths of frame F.

Just like a photographer must keep his camera steady to take sharp pictures, it is essential to keep the frame F as motionless as possible while engaged in sketching or drawing. This invention provides several aids in this respect. The head rest HR is one of them. As shown in FIG. 1, the sitting artist places rests 14 which are secured to lower ends of members 5 and 6 on top of his thighs T. His left hand H holds the left side 5 steady and vertical. After locating just the right view that the artist wants to capture, he places head rest HR to the top portion of the frame F and secures it there. After he decides on the distance between the panel P and his eye point E, he extends the telescopic member 26 of the head rest until its end 32 touches his mid-forehead, and locks the whole head rest assembly in that chosen position. When thus positioned, artist's eye E acts both as a station point and the eye point for the picture defined by dashed lines X radiating from point E. The artist may first draw rough sketches, criticize them, erase them and sketch new ones until he decides to procede further. Then he cleans up panel P, gets himself set and goes on.

For greater accuracy of the drawing, it is advisable to locate some conspicuous detail of the scene, such as the chimney L-L on the house of the scene, and marking it with a small pice of contrasting color, opaque tape as L on panel P, for easy three-point alignment between the artists eye E, chimney L-L of the house in the scene and the drawing of it at l on the picture plane panel P. This enables the artist to double-check the accuracy of his drawing exactly and repeatedly, even after prolonged interruptions on its progress.

The specifically configured drawing means C, when used for sketching and drawing purposes only, are of the relatively thin diameter of the "refill" variety adjustably insertable into rigid tubular and thin holders of at least 250 mm length, of dull finish, to keep artist's hand sufficient distance from panel P when drawing on it and avoid distracting mirror-like reflections of his hand on clear surfaces of panels B and P. A narrow, dull white band around the front tip of such holder will be helpfull when drawing fine details against dark backgrounds. On larger panels P, the commonly used artists mahlstick or rest stick will prove usefull. When it is hard to see the drawn lines against the dark colors or insufficient light of the scene, drawing materials of contrasting colors may be used.

To ckeck on the progress of the drawing, an opaque, preferably white colored panel D is positioned loosely behind panel B and all lines drawn on panel P will appear as if drawn on such opaque panel D. The panel D may be of any color which will clearly show the drawn lines, and of any desired size and shape as shown in FIG. 6, to be held securely and movably between artist's fingers inserted into any of elastic bands as 57, thus being able to reveal clearly any desired portion of the drawing in sharp detail for criticism and corrections. Variously shaped and sized opaque panels D may be temporarily suspended from the back side of the top portion of frame F and repositioned as desired by the artist.

This invention allows even the advanced student and artist to correctly "block in" the main elements of the composition of the scene on panel P, then place the panel D behind it and finish the drawing details in conventional manner, without using the head rest HR, and instead of looking through the frame F, filling in the rest of details as they are seen in their own manner. Thus, any artist may make use of this invention as far as he desires and from any point on continue on in his own regular manner of working. The main factor is that by now he has very quickly and accurately achieved not only the basic, over all layout of his intended composition, but also the portionately accurate contours of all elements drawn in correct perspective and proper relationship to each other.

Those artists unable to close either eye while "trace-drawing" on panel P may benefit by using an eye patch, either temporarily secured over their glasses or directly over one eye, to prevent the confusing effect of "double immage".

FIG. 2 shows some pertinent details which are referred to in describing several other figures in this description.

FIG. 3 shows the head-rest HR comprising a telescopic member 26 with enlarged head-pad 32 to rest against the forehead of the artist, its other end adjustably securable to frame F or to top edge of panel B by means configured on the principle of a spring-type paper binder clip 25, allowing the pad 32 to be adjustably positionable in all directions as indicated by arrows. Wing nut as 10 locks the head-rest in any selected position, even though it may be intermittently removed.

FIG. 4 shows a multiple arm support for larger head-rest. It comprises three simple rods as 31 adjustably radiating from their padded heat-rest 32, reaching to three sides of the frame F where they are adjustably secured to it by such as the spring-type clip 25, thus providing very steady head-rest.

Another type of head-rest is shown in FIGS. 5 and 6. It also uses a telescopic type member 26, but it is adjustably secured to adjustable head-band 18 worn by the artist and its front end is configured to simply hook over the top section of the frame F, thus effectively locking the artist's eye-point E to the picture-plane P.

FIG. 5 shows one of the simplest configurations of this invention. To practice quick, on the spot sketching, all that is needed is a sufficiently rigid panel B of the desired size, without any frame, and the specifically configured drawing means C. The artist simply holds such panel in one hand at the chosen position in front of his eyes and "trace-draws" on it whatever he chooses to record of what is visible to him through such panel B. He can easily erase these types of sketches from such panel and practice on it repeatedly. When thus used, the edges of these panels should be protected by tape or molding to prevent harmfull abrasions. Drawings made in this fashion may be reproduced by such as "Xerox" printers.

If the artist wants to preserve his drawings, he simply tapes the desired size panel of film-like material P onto the rigid panel B, sketches and draws on it as previously explained, removes it for safe keeping when finished with it and tapes on the next clean panel P to panel B, and continues on.

To provide more stability for such bare panels B, side members as 12,13 are rotatably secured at their corners by bolt and wing nuts 10, as shown in FIG. 2, so the artist may rest their lower ends on his thighs if he is sitting, and rotate them against the panel when not used.

A combination usable by sitting or standing artist has the lower ends of rigid members 12,13 modified as at 17 in FIG. 2, for coupling with various fittings as 16 into which fit rigid extensions securable by means 28 to adjustably positionable belt means 27 worn by the artist, thus providing support and stability for panel B by the body of either sitting or standing artist. To provide for additional ground support for such apparatus, the lower ends of members 12-13 are easily connectable to proper lengths of extensions needed. Also, the belt 27 may be separate and securable at different heights of artist's body to provide for greater adjustability of such assembly. FIG. 5 clearly shows how relatively rigid angular relationship between the panel B, head-rest HR and rigid members 12-13 secured to belt 27 is able to provide the desired stability to such assembly.

FIG. 6 is a perspective diagrammatic view showing another "Duopod" embodiment of this invention. The lower ends of frame F are modified as at 17 in FIG. 2, and fitted with elbows 16 to which are secured rigid members 12 and 13 whose lower ends are adjustably supported by bracket means 28 which are adjustably secured to belt means 27 adjustably secured to the torso of the artist. Also, to rearward ends of members 12-13 are secured back ends of a double-cross suspender-type shoulder belt means 30, each crossing the opposite shoulder of the artist and connected to fittings 16 on the same side of the artist from which it originated. This embodiment is usable by both sitting or standing artists, and if ground support is desired, the fitting 16 is replaced with a T type coupling and additional extensions 12-6 and 13-6 reaching to the ground are used to suit either sitting or standing artist.

While FIGS. 1 through 6 disclose and describe principles of the "Duopod" concept of this invention, wherein the sitting or standing artist provides the major portion of support and stability for such supporting apparatus, FIGS. 7 through 10 disclose the "Quadpod" concept of this invention, wherein such assembly is free-standing and self-supporting in any preselected position. Thus, once it is properly set up to suit the artist, he is free to sit or stand behind it repeatedly without disturbing its preselected setting.

FIG. 7 illustrates a collapsible studio-type "Quadpod" standing on table 33. The assembly of the frame F with its side members 5 and 6 may be similar as described in FIG. 1, except the lower ends of members 12 and 13 are provided with skidproof caps 34. Side members 5 and 6, as well as lower members 12 and 13 comprise evenly spaced holes 11 to accept bolt and wing-nuts 10 to allow vertical adjustment of such assembly. The auxiliary bracing members 35 and 36 comprise on their lower ends caps 34, their upper ends comprise modified strap-hinge means 55 for selective securement to strategically located holes 11 in side members 12 and 13 to insure vertical stability for the assembly. The rigid, length adjustable lateral brace means 37 and the longitudinally adjustable means as 29 are configured to provide sufficient stability to the assembly under all working conditions.

In another modification of this embodiment, the common leg-clamp means as 38 are permanently secured to lower ends of side members 5 and 6, and to the upper ends of members 12 and 13, thus providing slidable height adjustment and more rigidity for the assembly while eliminating holes 11 in members 12 and 13. Of course, any type of head-rests are usable with either "Duopod" or "Quadpod" assemblies.

FIG. 8 shows the full-height embodiment of the "Quadpod" explained in FIG. 7, adapted for use by standing artists and for outdoor use. This is accomplished by adding bracing members 39 and 40, preferrably by connecting them operatively and slidably to lower portions of members 35 and 36, using leg-clamp means as 38, as explained in the preceding paragraph.

FIG. 9 illustrates large, non-collapsible studio-type "Quadpod" configured with its sides 5 and 6 up to two meters long, with their bottom ends permanently secured to bottom, longitudinally disposed members 41 and 42, and two angularly disposed bracing members 45 and 46 help creating rigid triangular side structures. The bottom lateral brace members 43 and 44, as well as the top lateral brace 47 are configured to be laterally extendible by using means as 48 slide-and-lock adjustment means in order to accommodate varied widths of frames F. Upright members 5 and 6 comprise equally spaced apart holes 11 permitting vertical adjustment of the frame F. Locking caster wheels 49 permit easy moving of this "Quadpod".

FIG. 10 illustrates further modification of this invention for indoor practice of drawing such as still-life objects, anatomy, art reproductions and self portraits, to name a few uses. Horizontal members 41 and 42 are rigidly secured to lower ends of upright members 5 and 6 to create short legs 54 which are also provided at the back ends of members 41 and 42, thus keeping their mid-portions above the surface of the table 33. This enables members 41 and 42 to serve as longitudinal tracks for back and forth slidable movement of supporting panel 50 with its ledge means 51, to support various objects or art reproductions to be drawn or copied. To practice human anatomy and portraiture, a mirror is placed against panel 52 any desired distance back of frame F and the artist may practice drawing or painting his own portrait of his mirror immage.

FIG. 11 illustrates a small, portable, foldable embodiment combining the basic features of the "Duopod" and the "Quodpod" interchangeably, intended for general usage by anybody interested in pictorial art. The vertical side members 5 and 6 supporting the frame F are pivotally secured to modified front ends of members 41 and 42 by such as bolts and wing nuts 10. The rigid bottom panel 58 is secured to the bottom side of members 41 and 42, thus making the assembly free standing and self-supporting, with the frame F adjustably securable over broad angular range from panel 58. Any printed matter as 52 or object to be drawn is placed on panel 58, then the frame F is pivoted to any desired angle to suit the artist and supported there by auxiliary metal rods 59 insertable into suitably located holes 11 in members 5 and 6 coupled with similar holes 11 in members 41 and 42.

Very compact embodiment of this configuration usable by school children and art students of all ages folds into mere 355 mm×255 mm×25 mm (14"×1"×1") package which may be carried in a regular briefcase. It comprises a rigid panel 58 to which are secured straight members 41 and 42 with their back ends modifies as at 17 in FIG. 2, while to their front ends are pivotally secured upright members 5 and 6 as shown in the little detail sketch in FIG. 11, with their upper ends also modified as at 17 in FIG. 2. The upright members 5 and 6 have longitudinal slots to accept the rigid, clear panel B, in the same fashion as the frame F in FIG. 2. Thus the frame F is actually eliminated from this embodiment.

Thus configured convertible embodiment is self supporting just as the one shown in FIG. 11, usable as a table model. For outdoor use it is opened to function as a "Duopod" described in FIGS. 5 and 6. Its bottom panel 58 is rotated downward to function as replacement for supports 12-13 in FIG. 5, with the back edge of panel 58 resting against the soft mid-section of the sitting or standing artist. The modified ends as 17 of members 41 and 42, as well as upper ends of members 5 and 6 all accept such fitting means as 16 in FIG. 2, thus permitting to extend the support of such assembly to any needed length for either body or ground support as may be needed by either sitting or standing artist. Another option is to unbolt members 5 and 6 from members 41 and 42 at points 10, turn panel B over so its modified ends 17 face downward, insert them into fittings 16 and extend such members as 12-13 to accommodate either sitting or standing artist as with a regular "Duopod" described and disclosed in FIGS. 5 and 6 above.

Thus it should be obvious from the foregoing disclosure and drawings that this invention provides the art student with proper apparatus and aids to enable him to study and practice the realistic type of pictorial art in much easier manner than was heretofore possible.

For the sake of brevity, the above disclosed and described enbodiments of this invention are intended to be merly examplary and illustrative of the broad scope of this unique and novel approach to learning and practicing the realistic type of pictorial art. Since there are many more variations and embodiments possible without departing from the true scope of this broad invention, especially in combination with related existing and developing art of record, therefore all such other modifications are intended to be included within the scope of this invention as claimed in the following appended claims.

I claim:

1. An apparatus to aid in learning and practicing the art of realistic free-hand sketching, drawing and other pictorial arts comprising:
    a panel of specifically configured, relatively thin and transparent material (P) temporarily attached to and supported by relatively more rigid transparent panel (B) framed by a rigid frame assembly (F) if desired,
    adjustable apparatus to position and maintain said rigid frame (F) or panel (B) at the desired proximity in front of its sitting or standing user (A),
    auxiliary head-rest (means) (HR) to adjustably establish and maintain the desired distance between its user's eye point (E) and the surface of said transparent panel (P) if desired.
    said head-rest (HR) having its length telescopically adjustable, its extendible end (32) adapted to harmlessly rest against its user's forehead, its other end adjustably securable at the desired location to said frame (F) or said rigid panel (B) in a manner permitting the desired angular adjustability and securement of it thereto, and
    specifically configured marking, drawing or painting materials (C) enabling said sitting or standing user to mark, sketch, draw or paint on the facing surface of said transparent panel (P) whatever is visible through it.

2. An apparatus as defined in claim 1, wherein said headrest (HR) comprise three rigid members radiating from their juncture at (32), their other ends adjustably slidable at their means of securement to three sides of said frame (F).

3. An apparatus as defined in claim 1, wherein said headrest (HR) is adjustably supported by adjustable head-band means securable around artist's head, its telescopic body (26) supported at the two points by height adjustable means extending from said head-band (18), its forward end adapted for instant, intermittent connection to frame (F) or panel (B).

4. An apparatus as defined in claim 1, wherein the end of said head-rest means which comes into physical contact with the forehead of its users comprise sanitary, replaceable padded cushion means to prevent any accidental injury to its users.

5. An apparatus as defined in claim 1, wherein said supporting apparatus is configured as a "Duopod" assembly providing only partial support for said panel (P), while the rest of all necessary support, rigidity, stability and geometric positioning of it in front of its user is being provided by his physical body structure.

6. An apparatus as defined in claim 1, comprising left and right rigid, substantially vertically disposed members (5 and 6) adjustably supporting rigid panel (B) or its frame (F) between their upper portions, their lower ends configured to rest on thighs (T) of its seated user.

7. An apparatus as defined in claim 1, comprising left and right two-section assemblies, upper sections (5 and 6) adjustably supporting rigid panel (B) or its frame (F), their lower sections (12 and 13) configured to reach to the ground to accommodate its standing or seated artist.

8. An apparatus as defined in claim 1, wherein additional rigidity for such apparatus is provided by securing to lower ends of said members (5 and 6) auxiliary bracing means (12,13) adjustably securable to adjustable support means (28) worn by sitting or standing artist.

9. An apparatus as defined in claim 1, wherein said frame (F) has its lower corners adapted to accept means (16) for securement of adjustably disposed rigid members (12,13) with their opposite ends adapted for securement to supports (28) adjustably secured to belt means (27).

10. An apparatus as defined in claim 9, comprising double shoulder strap means (30) securable at their front ends to means (16), their back ends adjustably securable to back ends of members (12,13) at their juncture with supports (28).

11. An apparatus as defined in claim 9, wherein the lower corners of said frame (F) comprise such adaptive means (16) which will accept rigid, stabilizing extensions (13-6, 12-6) reaching to the ground in front of its seated or standing artist.

12. An apparatus as defined in claim 1, wherein said supporting apparatus for said panel (P) comprise a panel of rigid, transparent material (B) adapted to be supported by it's sitting or standing user.

13. An apparatus as defined in claim 1, wherein said auxiliary apparatus comprise rigid, adjustable structure configured as a free-standing "Quadpod" assembly, providing sufficient support, stability and adjustable positioning of said panel (P) without any physical support from its user.

14. An apparatus as defined in claim 13, wherein said "Quadpod" apparatus is configured to be collapsible, comprising left and right substantially vertically disposed rigid assemblies, their upper members (5,6) adjustably supporting panel (B) or its frame (F) at their upper portions, their lower ends configured to be vertically, adjustably securable to upper portions of similarly configured members (12,13), each of said side assemblies adjustably supported by additional rigid members (35,36) reaching angularly to the ground for added stability of such apparatus.

15. An apparatus as defined in claim 14, comprising longitudinally and laterally positionable auxiliary means adjustably interconnecting said side assemblies to provide added stability to said apparatus.

16. An apparatus as defined in claim 1, wherein said auxiliary apparatus comprise rigid, adjustable structure configured as a free-standing, studio model "Quadpod" assembly.

17. An apparatus as defined in claim 1, wherein said vertically disposed left and right side members (5,6) which support the frame (F) at their upper portions, have their lower ends rigidly secured to rigid, longitudinally disposed members (41,42) which movably, adjustably and securably support between them laterally disposed vertical panel means (50) which provides temporary support and adjustable positioning of such as art reproductions and other images or objects to be drawn by the artist.

18. An apparatus as defined in claim 1, comprising vertically disposed left and right members (5,6) operatively supporting between them the frame (F), while their bottom ends are pivotally secured to specifically modified longitudinal members (41,42) which are secured to bottom rigid panel (58); specifically configured bracing means (59) to support said frame (F) at the desired angle of inclination to said bottom panel (58).

19. An apparatus as defined in claim 1, wherein said apparatus is configured as a collapsible, convertible assembly foldable into compact unit that fits into a typical briefcase.

20. An apparatus as defined in claim 1, wherein said apparatus to support said panel (P) comprise a panel of rigid, transparent material (B) adapted to be held at chosen frontal relationship and proximity to sitting or standing user by one of his hands assisted by the headrest (HR).

21. An apparatus as defined in claim 1, wherein said supportive structure is configured as a free-standing table-top apparatus readily convertible for use by sitting or standing user.

22. An apparatus as defined in claim 1, wherein said auxiliary apparatus is configured to be wholly supported by the physical body structure of its sitting or standing user.

23. An apparatus as defined in claim 1, comprising auxiliary panels (D) of opaque material configured in suitable sizes, contours and colors and adapted to be temporarily positionable back of said panel (B) to cause the lines drawn on the face of said transparent panel (P) to appear as if they were drawn on such opaque panels (D).

* * * * *